United States Patent [19]
Takamiya et al.

[11] Patent Number: 5,552,879
[45] Date of Patent: Sep. 3, 1996

[54] DOPPLER VELOCIMETER

[75] Inventors: Makoto Takamiya, Tokyo; Hidejiro Kadowaki, Yokohama; Yasuhiko Ishida, Tokyo; Jun Ashiwa, Yokohama; Shigeki Kato, Tokyo; Shinji Ueda, Yokohama, all of Japan

[73] Assignee: Canon Kabushiki Kaisha, Tokyo, Japan

[21] Appl. No.: 285,529

[22] Filed: Aug. 4, 1994

[30] Foreign Application Priority Data

Aug. 23, 1993 [JP] Japan ................................. 5-229430

[51] Int. Cl.⁶ .................................................. G01P 3/36
[52] U.S. Cl. .................................... 356/28.5; 356/356
[58] Field of Search ...................... 356/28.5, 356

[56] References Cited

U.S. PATENT DOCUMENTS

| | | | |
|---|---|---|---|
| 4,632,548 | 12/1986 | Gunter, Jr. et al. | 356/28.5 |
| 5,216,478 | 6/1993 | Kodowaki et al. | 356/28.5 |
| 5,229,830 | 7/1993 | Ishida et al. | 356/28.5 |
| 5,272,512 | 12/1993 | Kadowaki et al. | 356/28 |
| 5,327,222 | 7/1994 | Takamiya et al. | 356/356 |

*Primary Examiner*—Mark Hellner
*Attorney, Agent, or Firm*—Fitzpatrick, Cella, Harper & Scinto

[57] ABSTRACT

A Doppler velocimeter includes an illuminating system for projecting a light beam for measurement onto an object to be measured at a predetermined working distance, and a light-receiving system for receiving light from the object illuminated with the light beam by the illuminating system. Information relating to a speed of the object is detected by a Doppler shift of the light received by the light-receiving system. The Doppler velocimeter further includes a changing device for changing the working distance of the illuminating system.

23 Claims, 8 Drawing Sheets

DOPPLER VELOCIMETER

BACKGROUND OF THE INVENTION

1. Field of the Invention

This invention relates to a Doppler velocimeter which detects changes in the speed of a moving object (a solid, a fluid, or the like, hereinafter termed an "object to be measured") in a noncontact state.

2. Description of the Related Art

Laser Doppler velocimeters detect a moving speed of an object to be measured utilizing the effect (Doppler effect) that the frequency of scattered light from the object irradiated by laser light Shifts in proportion to the moving speed of the object.

Figure 1:
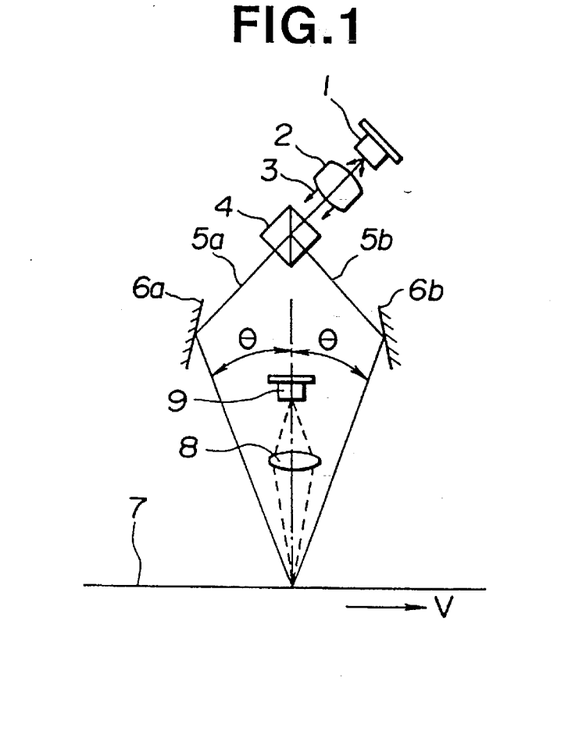
FIG. 1 is a diagram illustrating a conventional laser Doppler velocimeter.

FIG. 1 is a diagram illustrating a conventional laser Doppler velocimeter.

In FIG. 1, a laser light beam emitted from a laser 1 becomes a parallel light beam 3 after passing through a collimating lens 2, and is divided into two light beams 5a and 5b by a beam splitter 4. After being reflected by mirrors 6a and 6b, the light beams 5a and 5b are projected onto an object 7 to be measured, moving at a speed V, at an indicent angle θ.

Scattered light from the object 7 is detected by a photodetector 9 after passing through a condenser lens 8. At that time, the frequencies of scattered light beams of the two light beams are subjected to Doppler shifts of $+\Delta f$ and $-\Delta f$ in proportion to the moving speed V. If the wavelength of the laser light beam is represented by $\lambda$, $\Delta f$ is given by the following expression (1):

$$f = V \sin \theta / \lambda \tag{1}$$

The scattered light beams subjected to the Doppler shift of $+\Delta f$ and $-\Delta f$ interfere with each other, thereby producing a pattern comprising light and dark portions on the photosensing surface of the photodetector 9. The frequency of the pattern (hereinafter termed a "Doppler frequency") is given by the following expression (2):

$$F = 2\Delta f = V \sin \theta / \lambda \tag{2}$$

Accordingly, by measuring the Doppler frequency F of the output signal of the photodetector 9, the moving speed of the object 7 can be obtained from expression (2).

As is apparent from expression (2), in the above-described laser Doppler velocimeter, the Doppler frequency F is inversely proportional to the wavelength $\lambda$ of the laser light beam. Hence, it is necessary to use a laser light source capable of performing continuous oscillation and having a stable wavelength. A gas laser, such as a He-Ne laser or the like, is frequently used as such a laser light source. However, a gas laser oscillator is, in general, large in its size, and high voltage is required for its power supply, therby increasing the size and the cost of the entire apparatus. Although laser diodes (semiconductor lasers), used in compact discs, video discs, optical-fiber communication and the like, are very small and easy to drive, they have a problem of having temperature dependency of their characteristics.

Figure 2:
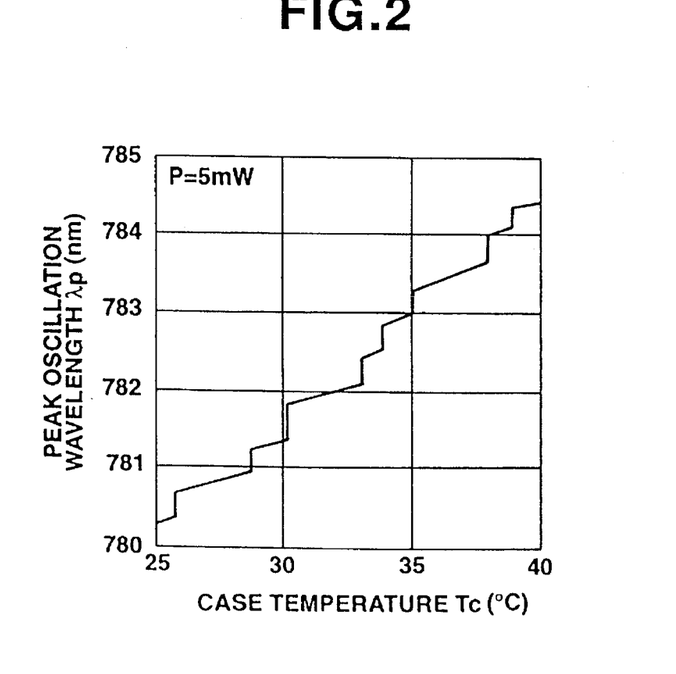
FIG. 2 is a diagram illustrating the temperature dependency of a laser diode.

FIG. 2 is a diagram illustrating a typical temperature dependency of the peak oscillation waylength of a laser diode, cited from "'87 Mitsubishi semiconductor data book; optoelectronic semiconductor devices". In FIG. 2, regions where the wavelength continuously changes reflect the temperature dependency of the refractive index of the active layer of the laser diode. The wavelength changes with a rate of 0.08–0.08 nm/°C. in these regions. Regions where the wavelength discontinuously changes are called "vertical mode hopping" regions. The wavelength changes with a rate of 0.2–0.3 nm/°C. in these regions.

In order to stabilize the wavelength of a laser diode, a method of controlling the laser diode at a constant temperature is adopted. In this method, temperature control members, such as a heater, a radiator, a temperature sensor and the like, must be mounted on the laser diode with a small heat resistance, and precise temperature control must be performed. As a result, the size and the cost of the obtained laser Doppler velocimeter considerably increase. Furthermore, instability caused by the above-described vertical mode hopping cannot be completely removed.

In order to provide a laser Doppler velocimeter which solves the above-described problems, a method has been proposed in U.S. patent application Ser. No. 839,708 (U.S. Pat. No. 5,216,478). in this method, a laser light beam from a laser light source is projected onto a diffraction grating. Two light beams, i.e., a +n-order diffracted light beam and a −n-order diffracted light beam (n=1, 2, . . . ) except a 0-order light beam, from among obtained diffracted light beams are projected onto an object 7 to be measured with the same crossing angle as the angle between the two light beams, and scattered light from the object 7 is detected by a photodetector.

Figure 3:
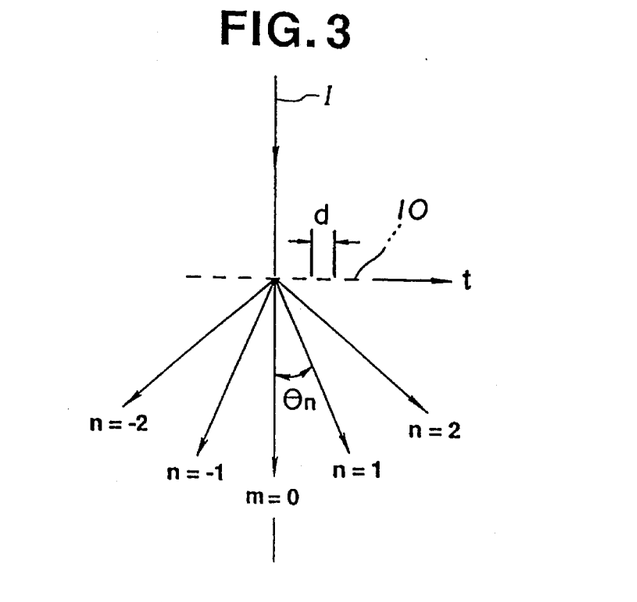
FIG. 3 is a diagram illustrating an example of diffraction when a laser light beam is projected onto a grating perpendicularly to the direction of arrangement of the grating.

FIG. 3 illustrates an example of diffraction when a laser light beam I is projected onto a transparent-type diffraction grating I, having a grating pitch d, perpendicularly to the direction of grating arrangement t. The angle of diffraction $\theta_0$ is given by the following expression (3):

$$\sin \theta_0 = m\lambda/d \tag{3}$$

where m is the diffract:Lion order (0, 1, 2, . . . ), and $\lambda$ is the wavelength of the laser light beam.

The diffraction angle of the ±n-order light beams, except the 0-order light beam, is given by the following expression (4):

$$\sin \theta = n\lambda/d \tag{4}$$

where n=1, 2, . . .

Figure 4:
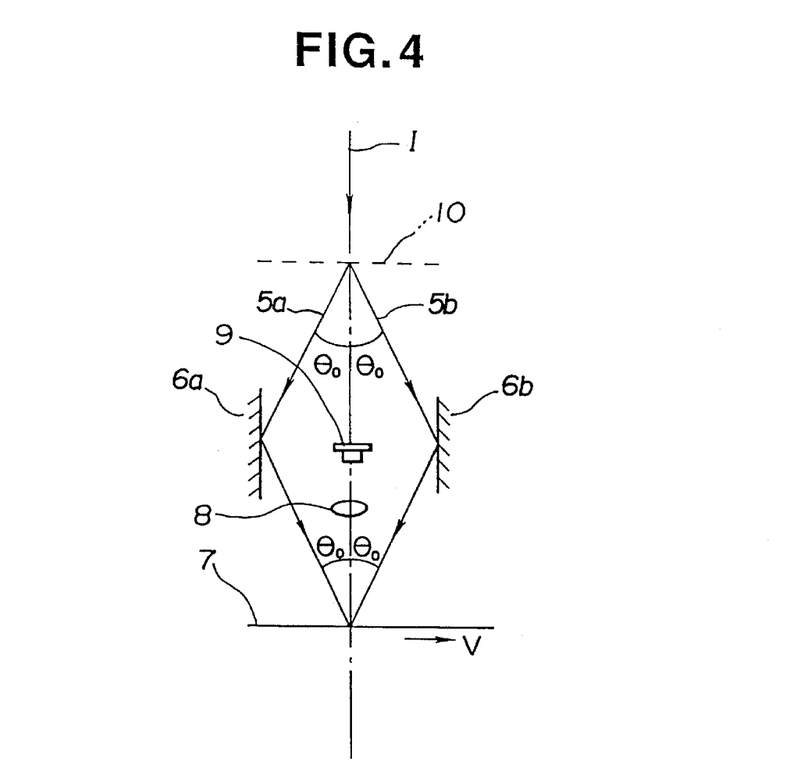
FIG. 4 is a diagram illustrating two light beams projected onto an object so as to have an angle of incidence θ₀.

FIG. 4 is a diagram =illustrating two light beams, i.e., ±n-order light beams, projected onto an object 7 to be measured via mirrors 6a and 6b with an incident angle $\theta_0$. Scattered light from the object 7 is incident upon a photodetector 9 via a condensor lens 8. The Doppler frequency F of the output of the photodetector 9 is given by the following expression (5) using the above-described expressions (2) and (4):

$$F = 2V \sin \theta_0 / \lambda = 2nV/d \tag{5}$$

As is apparent from expression (5), the Doppler frequency F does not depend on the wavelength $\lambda$ of the laser light beam I, and is inversely proportional to the grating pitch d of the diffraction grating 10. Since the grating pitch d can be sufficiently stable, the Doppler frequency F is only proportional to the speed of the object 7. The same result can be obtained even if a reflection-type diffraction grating is used as the diffraction grating 10.

Figure 5:
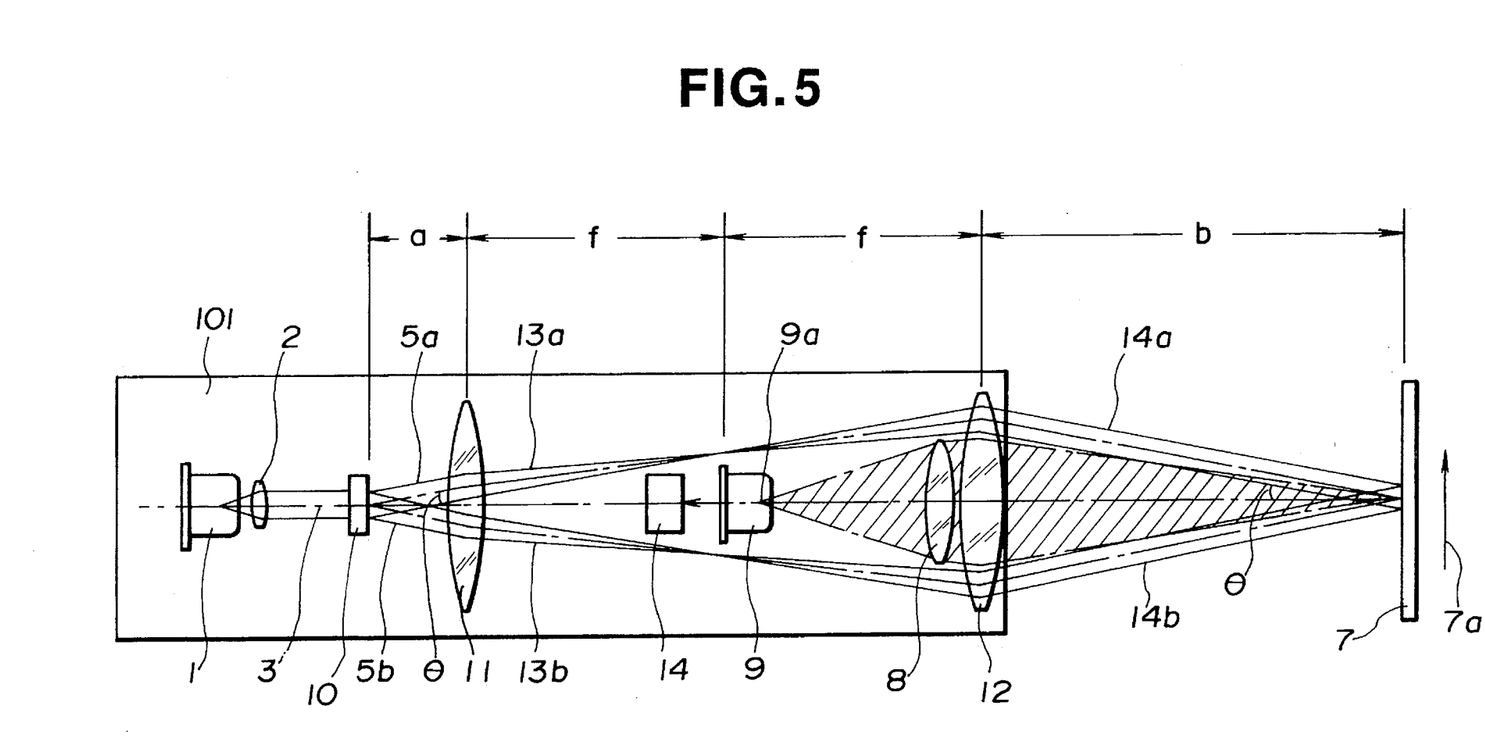
FIG. 5 is a schematic diagram of a principal portion of an optical system of a conventional laser Doppler velocimeter.

FIG. 5 is a schematic diagram of a principal portion of an optical system according to U.S. Pat. No. 5,256,885. In FIG. 5, there are shown a laser diode 1, a collimating lens 2 for making a laser light beam emitted from the laser diode 1 into a parallel light beam 3, and an object 7 to be measured. The parallel light beam 3 is projected onto a diffraction grating 10. Convex lenses 11 and 12 have a focal length f, and are arranged so that the relationship a+b=2f is satisfied, where "a" is the distance between the diffraction grating 10 and the convex lens 11, and b is the distance between the convex lens 12 and the object 7. These components constitute a laser Doppler velocimeter 101. The laser light beam, whose wavelength λ is about 0.68 μm, from the laser diode 1 is made into the parallel light beam 3, having a diameter of 2 mm, after passing through the collimating lens 2. The parallel light beam 3 is projected onto the transparent-type diffraction grating 10, having a grating pitch of 3.2 μm, perpendicularly to the direction of the grating arrangement, and emanates ±1order diffracted light beams 5a and 5b with a diffraction angle θ=12°. By projecting the light beams 5a and 5b onto the convex lens 11 having a focal length f of 15 mm, light beams 13a and 13b shown in FIG. 5 are obtained.

By projecting the light beams 13a and 13b onto the other convex lens 12 separated from the convex lens 11 by 2f(=30 mm), parallel light beams 14a and 14b are obtained. Each of the parallel light beams 14a and 14b has a spot size of 2 mm, and is projected onto the object 7, moving in the direction of an arrow 7a at a speed V (mm/sec), with the same angle as the diffraction angle θ from the diffraction grating 10.

Scattered light from the object 7 is efficiently condensed onto the photosensing portion 9a of a photodetector by the convex lens 12 and a condenser lens 8. An arithmetic detector 14, which receives photosensing signal from the photodetector 9, detects the speed V from the Doppler frequency F using the following expression (6):

$$F=2V/d \qquad (6).$$

By making a=10 mm, and b=20 mm so that b is relatively long, the working distance can be designed to have a large value, and therefore the degree of freedom when installing the laser Doppler velocimeter increases.

SUMMARY OF THE INVENTION

It is an object of the present invention to improve the above-described conventional Doppler velocimeters.

It is another object of the present invention to provide a Doppler velocimeter in which a large degree of freedom in the working distance is provided for the user, and a large degree of freedom is provided when installing the apparatus.

According to one aspect, the present invention, which achieves these objectives, relates to a Doppler velocimeter comprising an illuminating system for projecting a light beam for measurement onto an object to be measured at a predetermined working distance, and a light-receiving system for receiving light from the object illuminated with the light beam by the illuminating system. Information relating to a speed of the object is detected by a Doppler shift of the light received by the light-receiving system. The Doppler velocimeter further comprises changing means for changing the working distance of the illuminating system.

According to another aspect, the present invention relates to a Doppler velocimeter comprising an illuminating system for projecting two light beams for measurement so as to cross with each other at a position separated by a predetermined distance. An object to be measured is illuminated by the light beams at the crossing position. The Doppler velocimeter further comprises a light-receiving system for receiving light from the object illuminated by the light beams by the illuminating system. Information relating to a speed of the object is detected using a Doppler shift of the light received by the light-receiving system. The Doppler velocimeter further comprises changing means for changing the distance between the crossing position and the illuminating system.

According to still another aspect, the present invention relates to an optical system to be mounted on a Doppler velocimeter, in which a light beam for measurement is projected onto an object to be measured at a predetermined working distance, and information relating to a speed of the object is detected by receiving light from the object illuminated by the light beam, comprising a main-body unit detachably mounted on an illuminating system for projecting the light beam for measurement onto the object, and an optical unit for operating on the light beam for measurement in a state in which the main-body unit is mounted on the illuminating system. The working distance of the illuminating system changes from the distance when the main-body unit in not mounted, by the operation of the optical unit.

According to yet another aspect, the present invention relates to an optical to system to be mounted on a Doppler velocimeter, in which two light beams for measurement are projected onto an object to be measured while being crossed at a position separated by a predetermined distance, and information relating to a speed of the object is detected by receiving light from the object illuminated by the light beams, comprising a main-body unit detachably mounted on an illuminating system for projecting the light beams for measurement onto the object, and an optical unit for operating on the light beams for measurement in a state in which the main-body unit is mounted on the illuminating system. The distance between the illuminating system and the crossing position changes from the distance when the main-body unit is not mounted, by the operation of the optical unit.

The foregoing and other objects, advantages and features of the present invention will become more apparent from the following description of the preferred embodiments taken in conjunction with the accompanying drawings.

DESCRIPTION OF THE PREFERRED EMBODIMENTS

Figure 6:
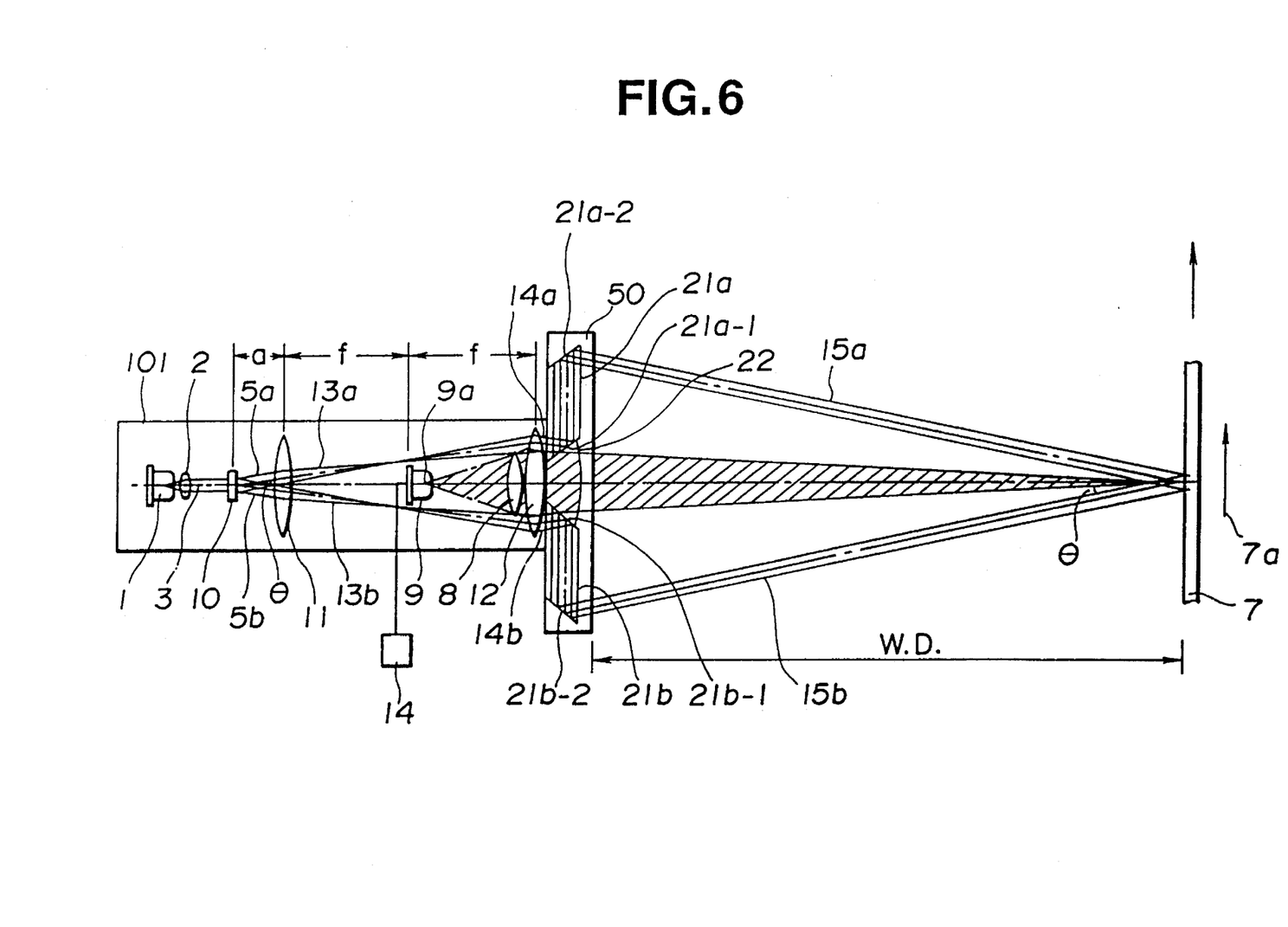
FIG. 6 is a schematic diagram of a principal portion of an optical system according to a first embodiment of the present invention.

FIG. 6 is a schematic diagram of a principal portion of an optical system according to a first embodiment of the present invention. In FIG. 6, the same components as those shown in the conventional optical system shown in FIG. 5 are indicated by the same reference numerals, and a description thereof will be omitted. In FIG. 6, reference numeral 50 represents a working-distance changing member, which comprises a pair of reflecting prisms 21a and 21b, whose end surfaces are obliquely formed, linearly arranged orthogonally to the optical axis. The working-distance changing member 50 is detachably mounted on the light-emitting surface of a laser Doppler velocimeter 101, for example, using screws.

In the first embodiment having the above-described configuration, light beams 14a and 14b emitted from the laser Doppler velocimeter 101 are reflected by first oblique surfaces 21a-1 and 21b-1, and second oblique surfaces 21a-2 and 21b-2 of the reflecting prisms 21a and 21b, respectively, while maintaining a crossing angle $2\theta$, and become light beams 15a and 15b to illuminate an object to be measured with an angle of incidence $\theta$. In the present embodiment, the working distance (W.D.) is about 70 mm. Scattered light from the object 7 is efficiently condensed onto the photo-sensing surface 9a of a photodetector 9 by a concave lens 22, a convex lens 12 and a condenser lens 8.

In the present embodiment, since the angle of incidence $\theta$ onto the object 7 equals the angle of diffraction, a Doppler signal, whose frequency is given by the above-described expression (6), is detected. In the present embodiment, the working-distance changing member 50 having the working distance of about 70 mm is used. However, the working distance can be arbitrarily changed by using a working-distance chaging member 50 having a different working distance, whereby the flexibility of the system is improved.

Figure 7:
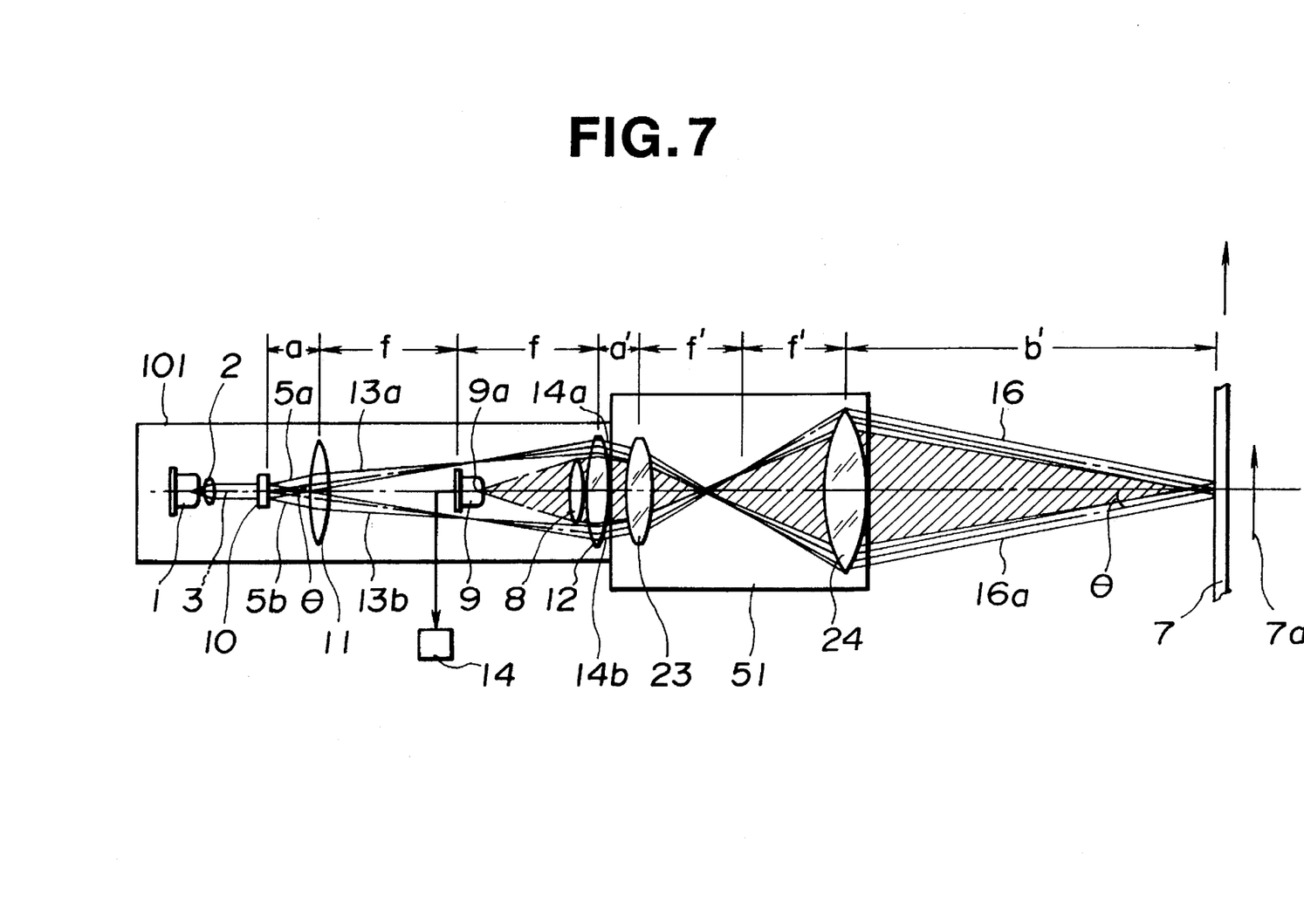
FIG. 7 is a schematic diagram of a principal portion of an optical system according to a second embodiment of the present invention.

FIG. 7 is a schematic diagram of a principal portion of an optical system according to a second embodiment of the present invention. In FIG. 7, the same components as those in the first embodiment shown in FIG. 6 are indicated by the same reference numerals, and a description thereof will be omitted. In FIG. 7, reference numeral 51 represents a working-distance changing member, which comprises lenses 23 and 24, having the same focal length f', arranged at an interval 2f' so as to provide an afocal optical system. If the distance between the lenses 12 and 23 is represented by a', and the distance between the lens 24 and the object 7 is represented by b', the following expression (7) holds:

$$a+a'+b'=2(f+f') \tag{7}$$

According to the above-described configuration, the light beams 14a and 14b emitted from the laser Doppler velocimeter 101 pass through the lenses 23 and 24 of the working-distance changing member 51, and become light beams 16a and 16b, respectively, which are projected onto the object 7 with an angle of incidence $\theta$.

If the components are arranged such that a=10 mm, a'=6 mm, f=15 mm, and f'=13 mm, then b'=40 mm. Since the imaging relationship does not change in the condensing optical system when changing the above-described values, the working distance can be easily changed.

Also in the present embodiment, since the angle of incidence $\theta$ onto the object 7 equals the angle of diffraction, a Doppler signal, whose frequency is given by the above-described expression (6), is detected. As in the first embodiment, the working-distance changing member 51 can be mounted on the light-emitting surface of the laser Doppler velocimeter 101 in the form of a lens mount.

In this second embodiment, the two lenses 23 and 24 having the same focal length are used as an afocal-system lens group. However, even if two lenses having different focal lengths are used, the parallel light beams 14a and 14b are projected onto the object in the form of parallel light beams, and the working distance can be changed. In such a case, however, since the angle of incidence $\theta$ on the object 7 does not equal the diffraction angle, a Doppler signal, whose freqenncy is not given by expression (6), is detected.

Figure 8:
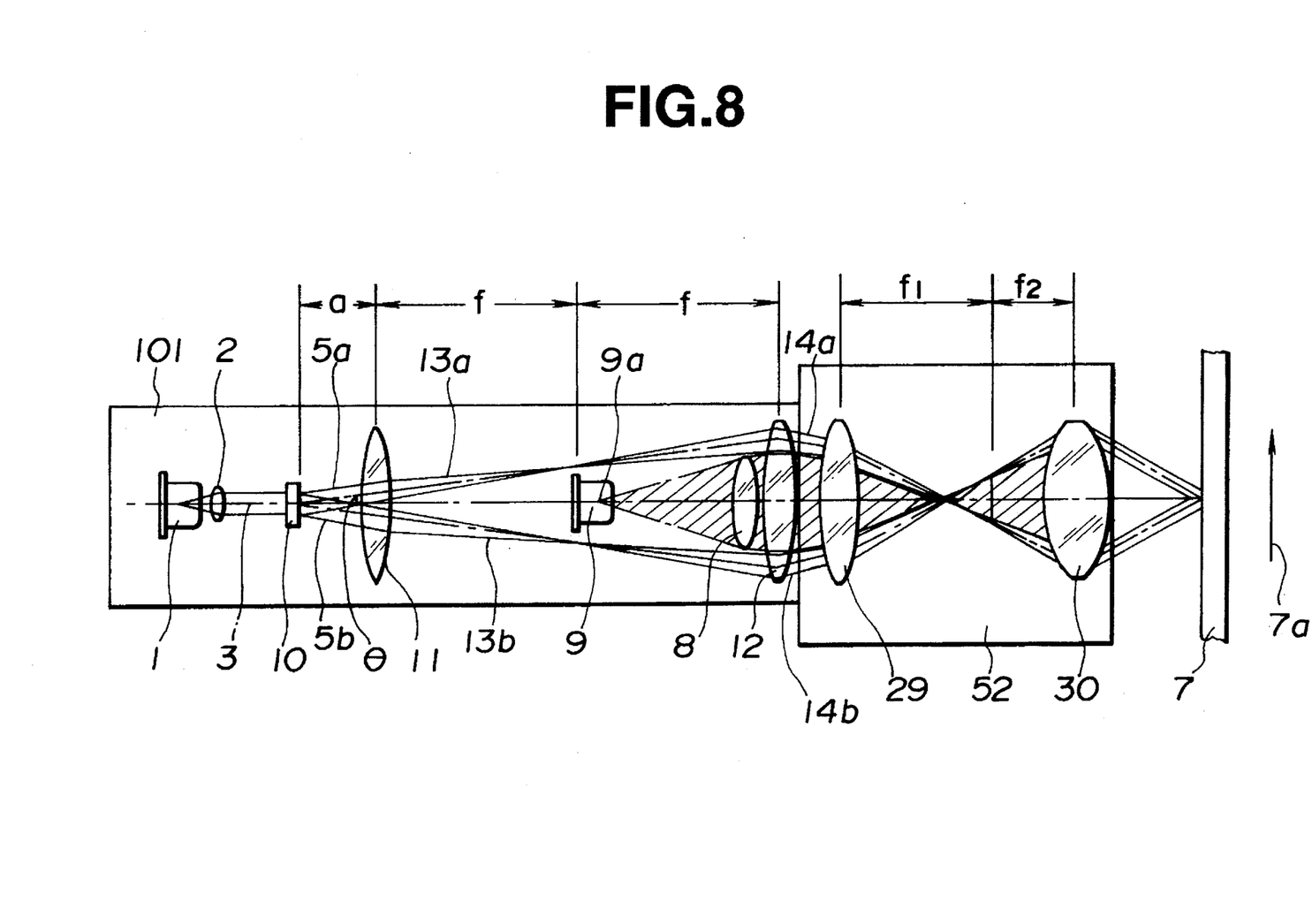
FIG. 8 is a schematic diagram of a principal portion of an optical system according to a third embodiment of the present invention.

FIG. 8 is a schematic diagram of a principal portion of an optical system according to a third embodiment of the present invention. In FIG. 8, the same components as those in the first and second embodiments shown in FIGS. 6 and 7, respectively, are indicated by the same reference numerals, and a description thereof will be omitted. In FIG. 8, reference numeral 52 represents a member for changing the pitch of interference fringes (a member for changing the angle of incidence).

The member 52 comprises a lens 29, having a focal length f1, and a lens 30, having a focal length f2, arranged at an interval of f1+f2. The lenses 29 and 30 constitute an afocal optical system.

The parallel light beams 14a and 14b, having a wavelength $\lambda$, cross with each other with an angle of incidence $\theta 1$, and produce interference fringes whose pitch P1 is expressed by the following expression (10):

$$P1=\lambda/2 \sin \theta 1 = 1.6 \, \mu \tag{10}$$

The light beams 14a and 14b are converged at the focus position f1 after passing through the lens 29, and become again parallel light beams after passing through the lens 30, and again cross with each other with an angle of incidence $\theta 2$. At that time, the height of the image H1 is given by the following expression (11):

$$H1 = f1 \times \tan \theta 1 = f2 \times \tan \theta 2 \tag{11}$$

The pitch P2 of interference fringes after conversion are expressed by the following expression (12):

$$P2=\lambda/2 \sin \theta 2 \tag{12}$$

In order to make the pitch P2 of interference fringes after conversion to be P1/2=0.8 µm, the lenses 29 and 30 must satisfy the following relationship from the above-described expressions (11) and (12):

$$f1/f2=2.159 \tag{13}$$

From the above-described expression (6), the Doppler frequency F at that time is:

$$F=V/0.8 \, (KHz) \tag{14}$$

In order to make the pitch P2 of interference fringes after conversion to be 2×P1=3.2 µm, the lenses 29 and 30 must satisfy the following relationship from the above-described expressions (11) and (12):

$$f2/f1=2.159 \tag{15}$$

From the above-described expression (6), the Doppler frequency F at that time is:

$$F=V/3.2 (KHz) \tag{16}$$

Figure 9:
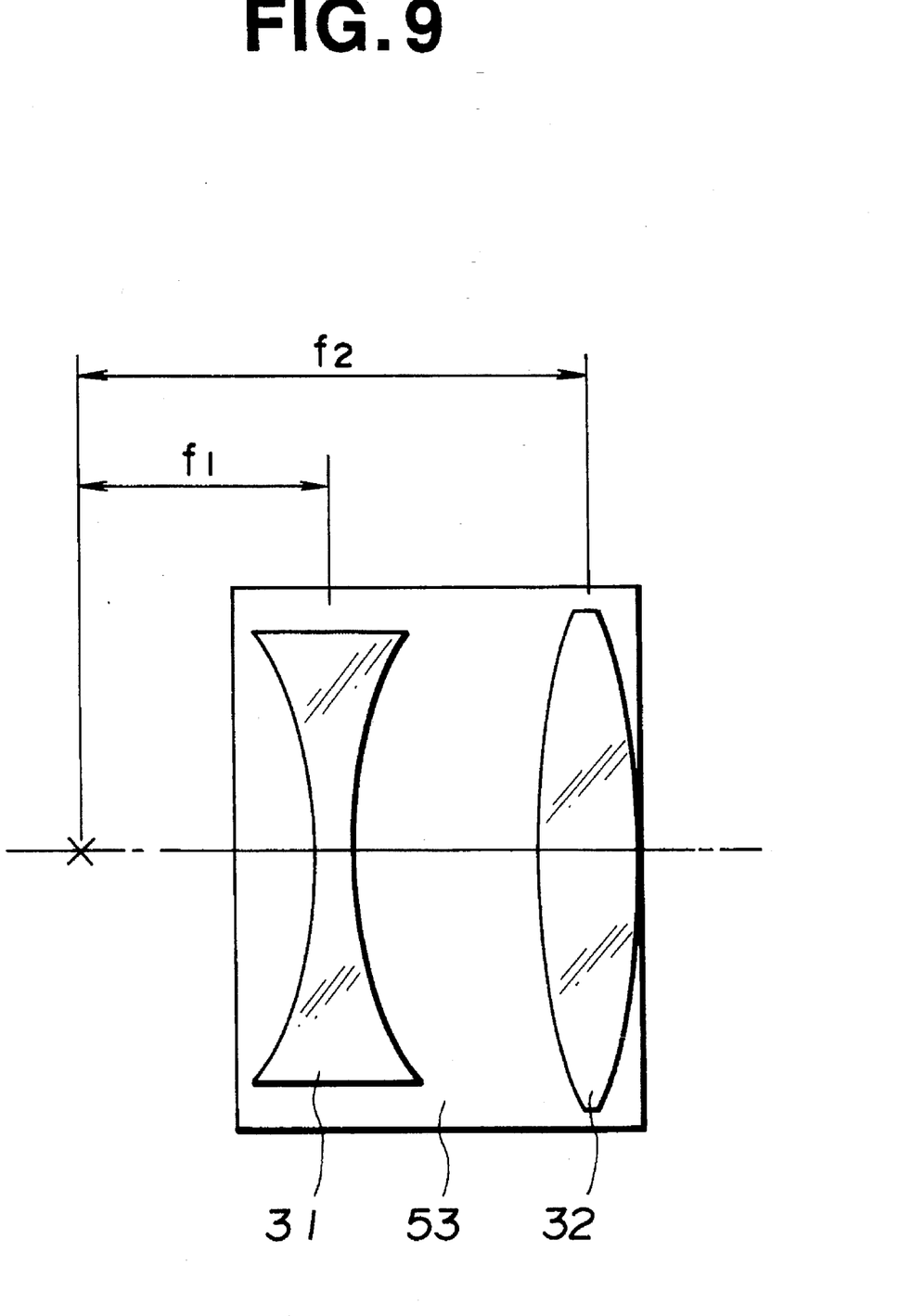
FIG. 9 is a diagram illustrating the optical system of a member for changing the pitch of interference fringes.

FIG. 9 illustrates the optical system of a member 53 for changing the pitch of interference fringes (a member for changing an angle of incidence) for making P2=3.2 μm. The optical system comprises a biconcave lens 31, having a focal length f1, and a biconvex lens 32, having a focal length f2. The lenses 31 and 32 constitute an afocal optical system.

Figure 10:
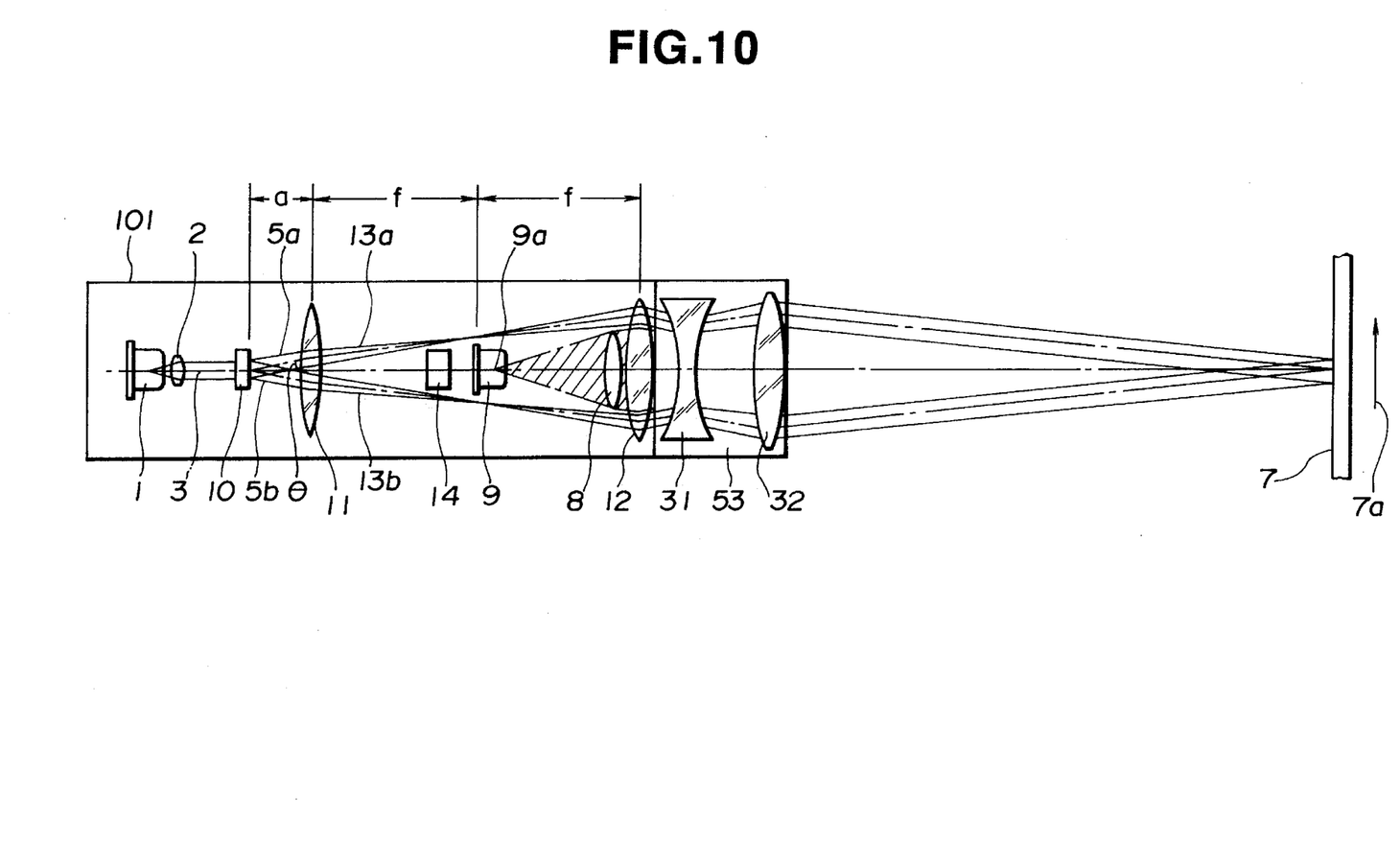
FIG. 10 is a schematic diagram of a principal portion of an optical system according to a fourth embodiment of the present invention.

FIG. 10 is a schematic diagram illustrating a principal portion of an optical system, including a member 53 for changing the pitch of interference fringes shown in FIG. 9 mounted on the laser Doppler velocimeter 101, according to a fourth embodiment of the present invention. Since the interval between lenses is short, this configuration is advantageous for providing a small apparatus.

The member 53 for changing the pitch of interference fringes can be mounted on the light-emitting surface of the laser Doppler velocimeter 101 in the form of a lens mount. If the member 53 is arranged so as to be mounted also in the reverse direction, the pitch of interference fringes can be increased or reduced using a single member 53.

As described above, according to the above-described embodiments, a working-distance changing member can be mounted on a laser Doppler velocimeter, so that the working distance can be changed in accordance with various applications. Hence, it is possible to provide a more flexible laser Doppler velocimeter.

In particular, according to the third embodiment, a member for changing the pitch of interference fringes can be mounted on the light-emitting surface of a laser Doppler velocimeter. Hence, it is possible to select the ratio of the Doppler frequency corresponding to the speed of an object, therefore to perform speed measurement of a wide range, and to provide a more flexible laser Doppler velocimeter.

Furthermore, by providing a laser Doppler velocimeter in which an incident-angle changing member mountable on the light-emitting surface of the velocimeter converts an angle of incidence θ1 into an angle of incidence θ2 and converts the speed of an object to be measured into a Doppler frequency expressed by $F2=2V\sin\theta2/\lambda$ based on a shift of the frequency F1 of scattered light from the object, the above-described effects can be obtained.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A Doppler velocimeter comprising:

an illuminating system for projecting a light beam for measuring velocity onto an object to be measured at a predetermined working distance;

a light-receiving system for receiving light from the object illuminated with the light beam by said illuminating system, wherein information relating to the velocity of the object is detected by a Doppler shift of the light received by said light-receiving system; and changing means for changing the working distance of said illuminating system, with the working distance being changed by mounting and detaching said changing means.

2. A Doppler velocimeter according to claim 1, wherein said changing means comprises a prism for deflecting an optical path of the light beam for measuring velocity.

3. A Doppler velocimeter according to claim 1, wherein said changing means comprises an afocal optical system.

4. A Doppler velocimeter according to claim 1, wherein said changing means comprises a plurality of members, detachable relative to said illuminating system, for providing different working distance.

5. A Doppler velocimeter comprising:

an illuminating system for projecting two light beams for measuring velocity so as to interfere with each other at a crossing position separated by a working distance from said illuminating system, wherein an object to be measured is illuminated by the light beams at the crossing position;

a light-receiving system for receiving light from the object illuminated by the light beams from said illuminating system, wherein information relating to the Velocity of the object is detected using a Doppler shift of the light received by said light-receiving system; and changing means for changing the distance between the crossing position and said illuminating system, with the distance being changing by mounting and detaching said changing means.

6. A Doppler velocimeter according to claim 5, wherein said changing means comprises prisms for deflecting optical paths of the light beams for measuring velocity.

7. A Doppler velocimeter according to claim 5, wherein said changing means comprises an afocal optical system.

8. A Doppler velocimeter according to claim 5, wherein said changing means comprises a plurality of members, detachable relative to said illuminating system, for providing different working distances.

9. A Doppler velocimeter according to claim 5, wherein said illuminating system has an optical arrangement such that the Doppler shift is not substantially influenced by variations in the wavelength of the two light beams for measuring velocity.

10. A Doppler velocimeter according to claim 9, wherein said changing means is configured so as to maintain a state in which the Doppler shift is not substantially influenced by variations in the wavelength of the two light beams for measuring velocity even if said changing means is mounted on said illuminating system.

11. A Doppler velocimeter according to claim 5, wherein said changing means changes a pitch of interference fringes formed by the two light beams for measuring velocity by being mounted on said illuminating system.

12. An optical system to be mounted on a Doppler velocimeter, in which a light beam for measuring velocity is projected onto a object to be measured at a predetermined working distance, and information relating to the velocity of the object is detected by receiving light from the object illuminated by the light beam, said system comprising:

a main-body unit detachably mounted on an illuminating system for projecting the light beam for measuring velocity onto the object; and an optical unit for operating on the light beam for measuring velocity in a state in which said main-body unit is mounted on said illuminating system, with the working distance of said illuminating system being changed when said main-body unit is not mounted, by the operation of said optical unit.

13. An optical system according to claim 12, wherein said optical unit comprises a prism for deflecting an optical path of the light beam for measuring velocity.

14. An optical system according to claim 12, wherein said optical unit comprises an afocal optical system.

15. An optical system to be mounted on a Doppler velocimeter, in which two light beams for measuring velocity are projected onto an object to be measured at a working distance, and information relating to a velocity of the object is detected by receiving light from the object illuminated by the light beams, said apparatus comprising:

a main-body unit detachably mounted on an illuminating system for projecting the light beams for measuring velocity onto the object; and an optical unit for operating on the light beams for measuring velocity in a state in which said main-body unit is mounted on the illuminating system, with the working distance between the illuminating system and a crossing position of the two light beams being changed when said main-body unit is not mounted by the operation of said optical unit.

16. An optical system according to claim 15, wherein said optical unit comprises prisms for deflecting optical paths of the light beams for measuring velocity.

17. An optical system according to claim 15, wherein said optical unit comprises an afocal optical system.

18. An optical system according to claim 15, wherein said optical unit changes a pitch of interference fringes formed by the two light beams for measuring velocity by being mounted on the Doppler velocimeter.

19. A Doppler velocimeter comprising:

an illuminating system for projecting two light beams for measuring so as to interfere with each other at a crossing position, an object to be measured being illuminated by the light beams at the crossing position;

a light-receiving system for receiving light from the object illuminated by the light beams from said illuminating system, with information relating to a velocity of the object being detected using a Doppler shift of the light received by said light-receiving system; and changing means for changing the pitch of the interference fringes formed by the two light beams for measurement, with the pitch of the interference fringes being changed by mounting and detaching said changing means.

20. A Doppler velocimeter according to claim 19, wherein said illuminating system has an optical arrangement such that the Doppler shift is not substantially influenced by variations in the wavelength of the two light beams for measurement.

21. A Doppler velocimeter according to claim 20, wherein said changing means is configured so as to maintain a state in which the Doppler shift is not substantially influenced by variations in the wavelength of the two light beams for measurement even if said changing means is mounted on said illuminating system.

22. An optical system to be mounted on a Doppler velocimeter, in which two light beams for measurement are projected onto an object to be measured while being crossed at a position, and information relating to a speed of the object is detected by receiving light from the object illuminated by the light beams, said apparatus comprising:

a main-body unit detachably mounted on an illuminating system for projecting the light beams for measurement onto the object; and an optical unit for operating on the light beams for measurement in a state in which said main-body unit is mounted on the illuminating system, the pitch of the interference fringes formed by the two light beams for measurement being changed by the operation of said optical unit.

23. An apparatus according to claim 22, wherein said optical unit comprises a focal optical system.

* * * * *

UNITED STATES PATENT AND TRADEMARK OFFICE
CERTIFICATE OF CORRECTION

PATENT NO. : 5,552,879
DATED : September 3, 1996
INVENTOR(S) : Takamiya et al.

It is certified that error appears in the above-indentified patent and that said Letters Patent is hereby corrected as shown below:

COLUMN 1:

Line 43, "F=2$\Delta$f=Vsin$\theta$/$\lambda$  (2)." should read --F=2$\Delta$f=2Vsin$\theta$/$\lambda$  (2).--.
Line 63, "waylength" should read --wavelength--.

COLUMN 2:

Line 2, "0.08-0.08 nm/°C." should read --0.05-0.06 nm/°C.--.
Line 18, "in" should read --In--.
Line 34, "diffract:Lion" should read --diffraction--.
Line 43, "=illustrating" should read --illustrating--.

COLUMN 3:

Line 22, "a at a" should read --at a--.

COLUMN 5:

Line 35, "chaging" to --changing--.

COLUMN 6:

Line 28, "P1=$\lambda$/2 sin $\theta$1=1.6 $\mu$  (10)." should read --P1=$\lambda$/2 sin $\theta$1=1.6 $\mu$m  (10).--.

COLUMN 8:

Line 4, "distance." should read --distances.--
Line 15, "Velocity" should read --velocity--.
Line 19, "changing" should read --changed--.
Line 59, "mounted," should read --mounted--.

UNITED STATES PATENT AND TRADEMARK OFFICE
CERTIFICATE OF CORRECTION

PATENT NO. : 5,552,879
DATED : September 3, 1996
INVENTOR(S) : Takamiya et al.

It is certified that error appears in the above-indentified patent and that said Letters Patent is hereby corrected as shown below:

COLUMN 9:

Line 26, "measuring" should read --measurement--.

COLUMN 10:

Line 30, "apparatus" should read --optical system--.

Signed and Sealed this

First Day of April, 1997

BRUCE LEHMAN

Attest:

Attesting Officer

Commissioner of Patents and Trademarks